April 12, 1938.　　R. S. SANFORD ET AL　　2,113,860
VEHICLE CONTROL
Filed Feb. 6, 1932　　7 Sheets-Sheet 4

FIG. 4

INVENTOR.
ROY S. SANFORD
MONTGOMERY W. McCONKEY
BY
ATTORNEY

FIG. 6

Patented Apr. 12, 1938

2,113,860

UNITED STATES PATENT OFFICE 2,113,860

VEHICLE CONTROL

Roy S. Sanford and Montgomery W. McConkey, South Bend, Ind., assignors to Bendix Aviation Corporation, South Bend., Ind., a corporation of Delaware Application February 6, 1932, Serial No. 591,427

32 Claims. (Cl. 192—.01)

This invention relates to vehicles such as automobiles, and is illustrated as embodied in the chassis of a passenger car, the particular chassis shown having individually-sprung wheels and novel power-transmitting mechanism between the engine and the drive wheels.

An important object of the invention is to simplify the controls (e. g. the controls for the speed-change or gear-shifting means, for the clutch or its equivalent, for a lock-out for a freewheel drive, for the braking system, etc.), to reduce to a minimum the number and complexity of the operations required of the driver.

One of the principal features of the invention, which is very desirable although not necessarily associated with individual spring suspensions for the wheels, is the provision between the drive wheels of a unit (preferably supported on the chassis frame) replacing the conventional differential and not only driving the axle shafts in the general manner of a differential but also including the speed-change means or gearing.

Various features of novelty relate to arranging so that the gear-shifting is done by power, preferably derived from the vacuum of the engine intake manifold, and so that the normal second speed and direct drive, which are the only speeds used in the greater part of the driving of a car, are arranged for a separate simplified control while the low speed and reverse gears, which are used much less, are controlled by separate means readily accessible to the driver but normally out of his way.

We prefer to incorporate in the above-described unit a novel free wheel drive between the change-speed gearing and the wheels, one of the features of which is the use of a power-operated lockout or safety device which is not only capable of manual control but which acts automatically, if anything goes wrong, to lock out the free wheeling action and give positive drive to the wheels and also arranged to be interconnected with the manual control so as to be automatically locked out and provide positive drive when reverse gear is selected and to automatically return to its former action when the manual control is moved to select any other speed than reverse.

In one very desirable arrangement a power-operated clutch, shown as operated by a novel vacuum power unit, is controlled by the driver, for example being actuated to throw out the clutch when the accelerator pedal is released, and preferably has associated therewith a heel-pedal or the like controlling the power unit which operates the second speed-high speed gearing. In the form shown in the drawings, both second and high speeds are direct drives, although a silent gear of some kind may be used for second speed if desired.

Thus the throttle, the clutch, and most of the speed changes (i. e. all but low speed and reverse) are controlled merely by the position of the right foot. For example, in the arrangement shown in the drawings, rocking the toe upward and coming down on the heel operates (1) to slow up the engine speed, (2) to throw out the clutch, and (3) to shift from high speed (or the usual direct drive) to second speed (or from second to high, as the case may be), whereupon reversing the movement of the foot and coming down on the toe (for example as a traffic light changes from red or orange to green) operates (4) to throw in the clutch and (5) to speed up the engine. This is especially effective when the above-described freewheel arrangement is used, as this eliminates all possibility of clashing the gears in shifting. We prefer to interlock the gearshift with the clutch control, so that the gears cannot be shifted unless the clutch is out. The above-described arrangement, as hereinafter more fully discussed, is a modification of that described in application No. 580,434, filed December 11, 1931, by Victor W. Kliesrath and Roy S. Sanford, and the broader claims thereon are in said Kliesrath and Sanford application.

Low gear and reverse, which are used relatively seldom by most drivers, together with a fourth or extra-low speed if desired, may be obtained by a set of auxiliary change-speed gears, shown in the drawings for convenience as being of the progressive type and preferably forming a part of the above-described transmission-differential unit. These gears, according to another feature of the present invention, are shifted by vacuum or other power, shown as controlled by a novel follow-up valve pre-set by means such as a selector handle on the instrument board or steering wheel, and preferably rendered operative to shift to the selected gear by the throwing out of the clutch the next time the accelerator pedal is released.

A safety device may be provided positively to prevent unintentional pre-setting of the selector handle or its equivalent in "reverse" position so that the operator will know not to use this position before coming to a full stop because, while such a shift may be made smoothly and without clashing by the mechanism herein described (the clutch being out and the drive wheels freewheeling), the re-engagement of the clutch with the gears in reverse and the vehicle still in forward motion would throw an undesirable strain on the entire power-transmitting system from the engine to the wheels.

Other features of the invention relate to a novel substitute for a conventional differential, arranged to drive the slower wheel rather than the wheel offering the least resistance, to the arrangement of the brakes and their operating mechanism, to the structural features of the various devices included in the combinations described above, and to other novel and desirable structures and features which will be apparent from the following description of the illustrative embodiments shown in the accompanying drawings, in which:

The vehicle selected for illustration is an automobile chassis including an internal combustion engine 20, having the usual intake manifold 22 and carburetor 24, with the passage from the carburetor to the manifold controlled by the usual throttle valve having an operating arm 26. The throttle arm 26 is connected, by means such as a lengthwise-movable rod 28, with an accelerator pedal or the like 30, and is ordinarily also independently operable through a second lost-motion connection 32, for example by the usual hand throttle lever on the steering column. The accelerator pedal 30 or its equivalent is pivotally mounted on the floorboard 34, for manipulation by the toe of the driver's right foot. The rod 28 has a lost-motion connection with the throttle arm 26, so that it may have a short additional motion (for manipulating the clutch-control valve described below) after the throttle is closed.

The engine is arranged to drive the vehicle by driving road wheels 36 through axle shafts 38. While not necessarily so limited, the invention is especially applicable to an arrangement in which there is no axle carrying the wheels 36, instead of which the wheels are individually sprung, with suitable universal joints at both ends of both the axle shafts 38.

The present invention has mainly to do with the power-transmitting mechanism through which the engine 20 drives the axle shafts 38 or their equivalents, and to a system of simplified controls therefor.

Immediately behind the engine flywheel and its housing 40 is arranged a clutch of any desired character, in a clutch housing 42, through which clutch the engine drives a propeller shaft 44. The clutch is operated, against the resistance of the usual clutch springs (not shown), by a clutch shaft or the like 48 (Figures 5 and 8) normally operated by a power device acting on an arm 50 secured on the clutch shaft. Spring 46 holds the manual lever 82 in the normal position shown.

Figure 5:
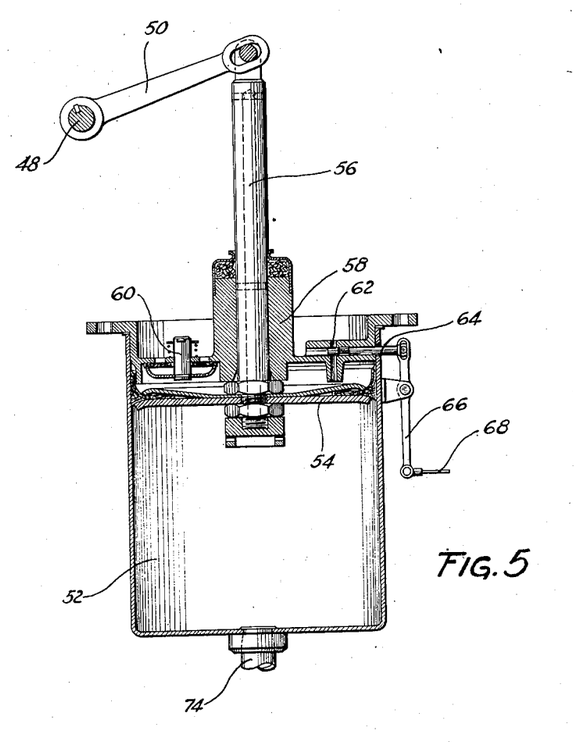
Figure 5 is a section, substantially horizontal, through the clutch control power unit shown in top plan in Figure 1.

The power device illustrated in Figure 5 includes a cup-shaped cylinder 52 having its open end engaging and bolted to the rear face of the clutch housing 42, over an opening therein. Within the cylinder is a suitable piston 54 shown connected to the clutch-operating arm 50 by a piston rod 56 passing slidably through a bearing in an end plate 58 closing the forward end of the cylinder 52.

The end plate 58 has a rearwardly-opening check valve 60, permitting air to enter freely between the end plate and the piston as the piston is sucked rearwardly to throw out the clutch. The end plate also has an air-exhaust passage 62, controlled by a slide valve 64 operated by a lever 66 connected by a Bowden wire 68 passing through a Bowden conduit 70 (Figure 1) and connected to a crossbar or the like 72 mounted on the accelerator connection 28. Thus the exhaust of air from the space ahead of the piston 54, and therefore the speed of re-engagement of the clutch when the accelerator pedal is depressed, is controlled according to the extent of depression of the accelerator, and therefore may be controlled substantially according to the speed of the engine.

The cylinder 52 is connected, through a fitting 74, with the intake manifold 22 by means of a conduit 76 controlled by any type of conventional three-way valve 78 operatively connected to the crossbar 72 so that the piston 54 is automatically sucked rearwardly to disengage the clutch whenever the accelerator pedal 30 is fully or completely released. The valve 78 may be substantially as more fully described and as claimed in Patent No. 2,036,053, filed October 10, 1931, by Victor W. Kliesrath, and does not in itself form any part of the invention of the present application and will therefore not be further described. It will be seen that the clutch is automatically disengaged whenever the accelerator pedal is released, and is re-engaged by depressing the accelerator pedal, the speed of re-engagement being controlled according to the degree of accelerator depression and therefore may be controlled substantially in accordance with the engine speed.

If for any reason the above-described power clutch operator fails to work, the driver can depress a pivoted section 80 (Figure 8) of the floor-board, thereby operating an arm 82 having a one-way connection with the clutch shaft 48 and operating the clutch manually. The arm 82 is shown provided at its upper end with a roller engaging the pivoted floorboard section 80. A suitable spring 46 holds the floorboard section 80 and the arm 82 in their upper positions unless deliberately depressed by the driver.

Figures 1, 7, 8:
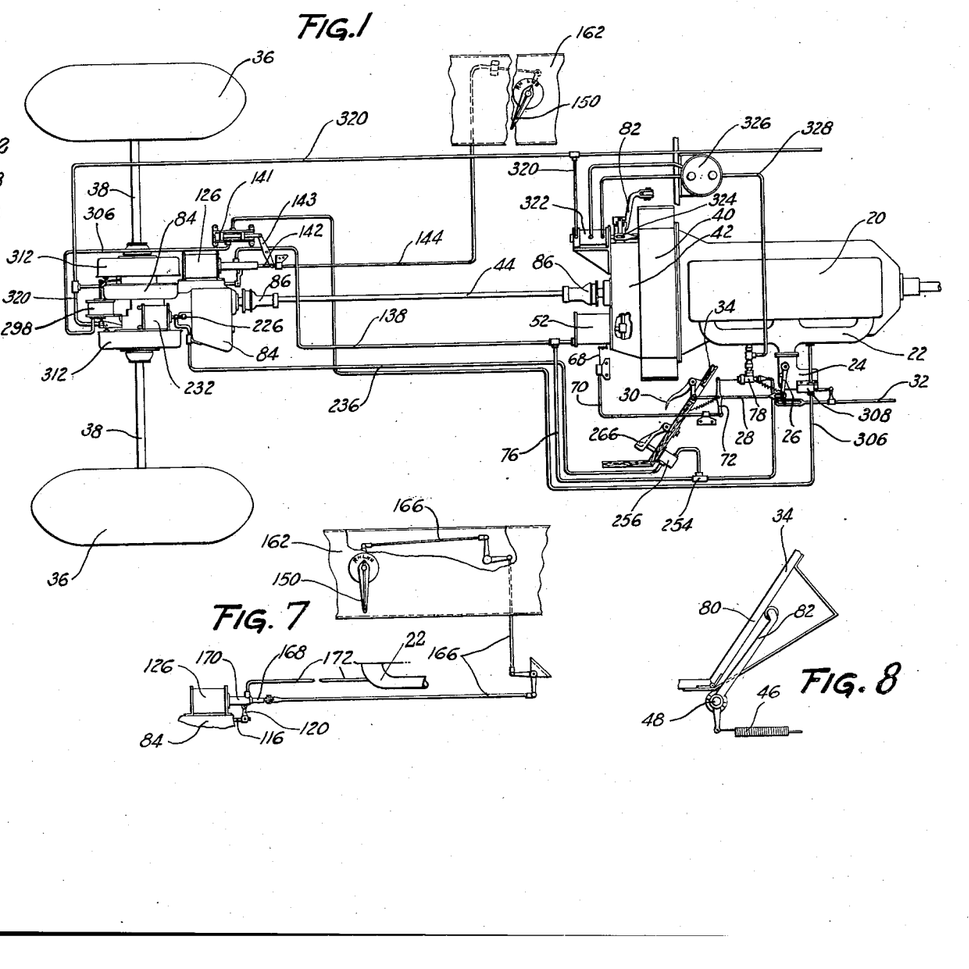
Figure 1 is a diagrammatic assembly view, mostly in plan but partly in vertical section through the floor board and the instrument board to show some of the controls, of an automobile chassis embodying our invention.
Figure 7 is a diagram showing the control of a power unit such as the one shown in Figure 6.
Figure 8 is a vertical section through part of the floorboard, showing a part of the floorboard depressible to throw out the clutch manually if the power fails.
Figure 2:
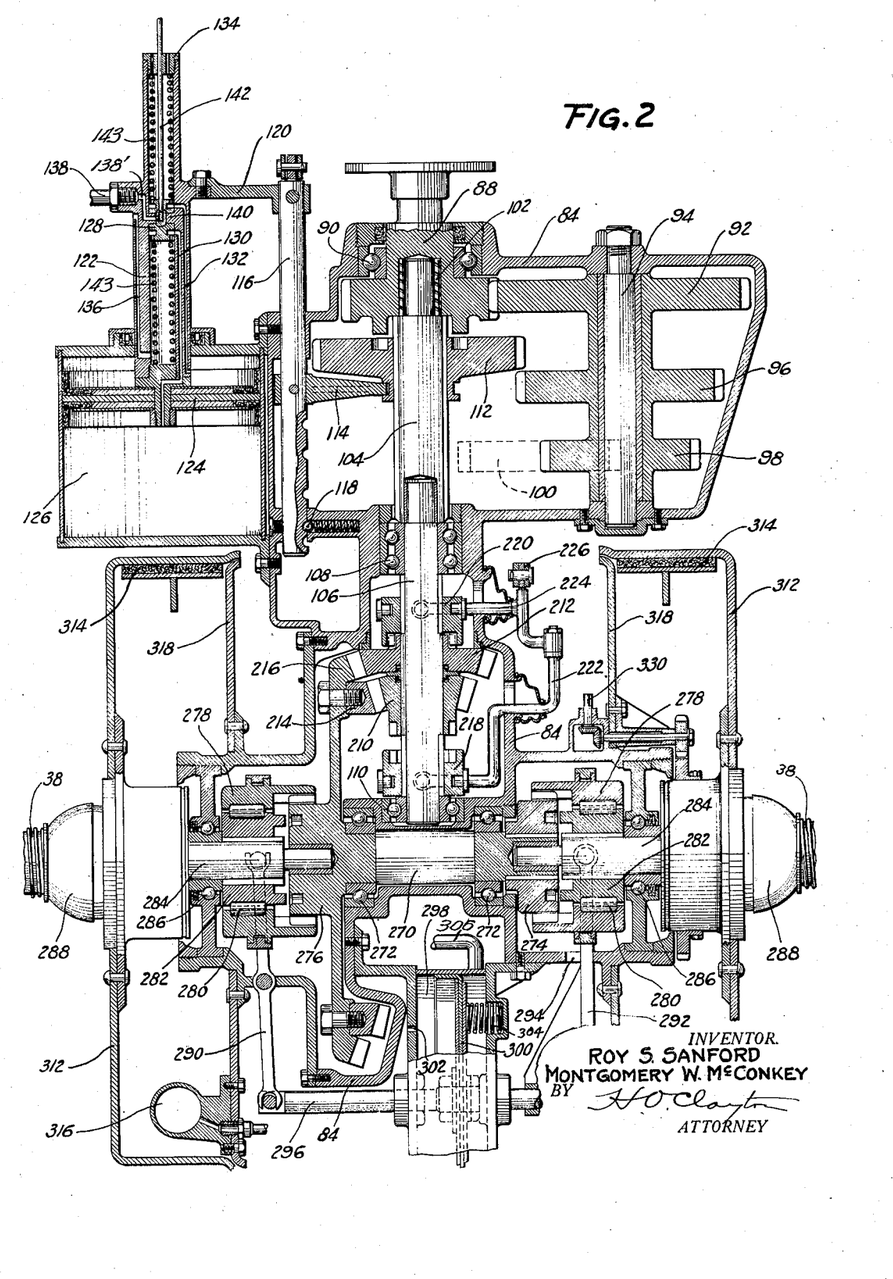
Figure 2 is a horizontal section through the novel transmission-differential unit shown in plan in Figure 1.

The propeller shaft 44 drives the rear axle shafts 38 through a novel unit, preferably supported on the chassis frame and shown in top plan in Figure 1 and in horizontal section in Figure 2, and which in the particular embodiment shown in these figures includes the following principal parts: (1) a low-speed—direct-drive—reverse change-speed gearing with a novel vacuum power operator, (2) a high-second gear-shift independent of (1) and also provided with a vacuum power operator, (3) a differential or its equivalent, being shown as one form of what is usually called a "locking differential", (4) a free wheel drive to each shaft 38, (5) a lockout, preferably power-operated, for the free wheel drives, and (6) a pair of hydraulic or other brakes acting on the wheels 36 through the axle shafts 38. The above parts are all carried by, and are mostly housed within, a housing or gear-box 84 formed in suitable sections bolted together.

The propeller shaft 44 (which may if desired have universal joints 86 at its forward and rear ends) drives a short shaft 88 journaled in a bearing 90 carried by the gear-box 84, and formed at its rear end (inside the gear-box) as a small pinion meshing with and driving a large gear 92 forming part of a three-gear cluster rotatably mounted on a fixed countershaft 94. The gear cluster also includes a medium sized gear 96 and a small gear 98, the last-named gear meshing with a reverse idler gear 100 (carried by a removable cap above or below the plane of Figure 2, and therefore indicated in dotted lines).

Piloted in the rear end of shaft 88, in the roller bearing 102, is the forward end of a driven shaft 104 splined or keyed at its rear end to an aligned pinion shaft 106 journaled in bearings 108 and 110 carried by the gear-box 84. Splined on the driven shaft 104 is a movable driven gear 112 slidable by a suitable shifter fork 114 from the neutral position shown in Figure 2, rearwardly to mesh with gear 96 or reverse gear 100, or forwardly to bring clutch portions on its forward face into interengagement with corresponding clutch portions on the rear face of the pinion and shaft 88 to give direct drive (this last being the normal position of gear 112).

The shifter fork 114 or its equivalent is carried by means such as a lengthwise-slidable shifter rod 116 having a series of notches interlocking with a spring-pressed ball 118 to give the following positions, in order from the lower (rear) end of the rod: (1) direct drive, (2) neutral, (3) low gear (in mesh with gear 96), (4) neutral, and (5) reverse (in mesh with gear 100).

The shifter rod 116 is shown rigidly secured, by a crossbar or the like 120, to a piston rod 122 carried by a double-acting piston 124 in a power cylinder 126 mounted on the gear-box 84. The piston rod 122 is hollow, and contains a slide valve 128 controlling a passage 130 opening through the piston 124 into the space below (behind) the piston, and a passage 132 opening above (ahead of) the piston.

The upper end of the hollow piston rod communicates with the atmosphere through openings in a plug 134 threaded into the end of the piston rod, and the lower end of the hollow piston rod communicates with the atmosphere through a passage 136 which opens outside the power cylinder in all positions of the piston. A flexible vacuum connection 138 opens inside the hollow piston rod through a passage 138' opening through an internal collar 140 substantially midway of the piston rod and which passage is controlled by the slide valve 128.

The valve 128 is of the follow-up type, and includes three disconnected parts, viz: upper and lower valve slides each having an annular external groove and passages therefrom leading out through the end of the slide away from the collar 140, and a central operating button with rounded ends fitting into seats in the adjacent faces of the valve slides, and which is of a size to pass easily through the collar 140, and which is carried by and secured to the end of a relatively stiff Bowden wire 142 passing through the plug 134.

In the operation of the power device just described, the valve 128 can be pre-set for any gear position desired, before suction is applied through conduit 138. If the wire 142 and button on its end are pushed downwardly (i. e. rearwardly), the lower slide valve will be pushed down to a corresponding position. This connects the vacuum conduit 138 through passage 130 with the space below (behind) the piston 124, leaving the space above (in front of) the piston connected to the atmosphere. Or if the wire is pulled upwardly (forwardly) instead, the upper valve slide is pulled in a corresponding direction, connecting the vacuum conduit 138 through passage 132 with the space above (in front of) the piston 124, leaving the space below (behind) the piston connected to the atmosphere.

When now the vacuum is applied through conduit 138, the piston 124 follows the valve until the latter regains the position of parts shown in Figure 2, thereby shifting the gears to the position for which the valve 128 was preset. Springs 143 operate to force the upper and lower slides of the valve 128 into contact with the collar 140, except when moved away therefrom with operation of the wire 142.

The Bowden wire 142 is shown passing through a Bowden conduit 144, and as being connected at its forward end to a device such as an arm 146 keyed to a shaft 148 connected to a pre-selector handle 150. The handle 150 is formed with a pointer passing over a scale 152 indicating the different gear positions.

A valve 141 is also connected to Bowden wire 142 through the medium of a transfer lever 143 and operates to admit atmosphere to the cylinder 298 through the rearward portion of conduit 306 when the selector valve 150 is moved into reverse position thus providing positive drive in reverse speed.

Figure 10:
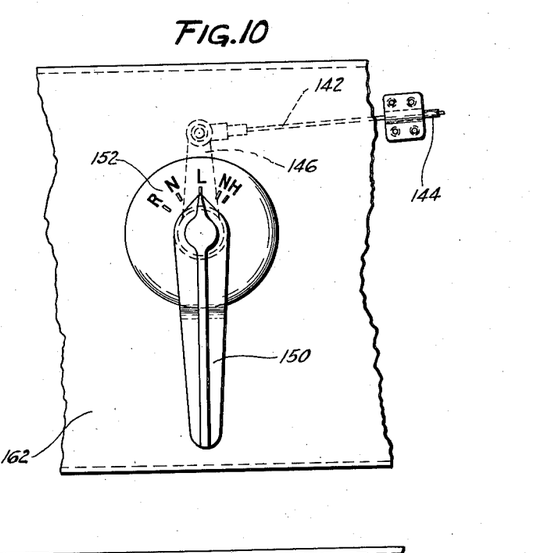
Figures 10 and 11 are respectively a front elevation and a vertical section, showing on a larger scale than Figure 1 the control for the low-reverse gearshift.
Figure 11:
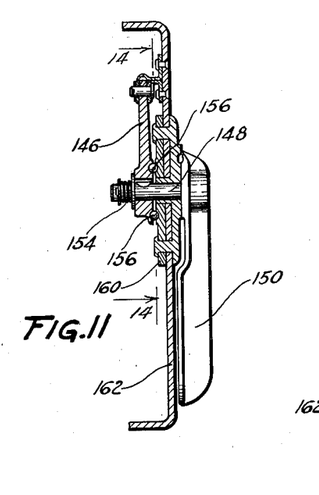
Figure 12:
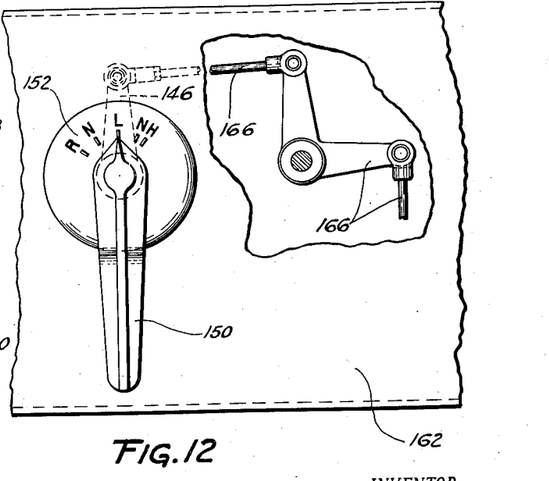
Figures 12 and 13 are similar views of the modified low-reverse control shown in Figure 7.
Figure 13:
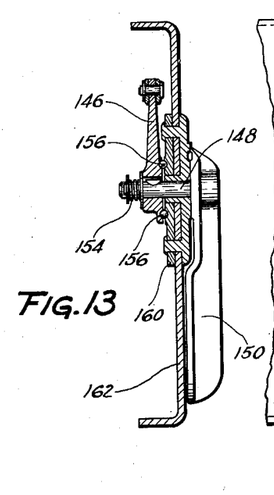
Figure 14:
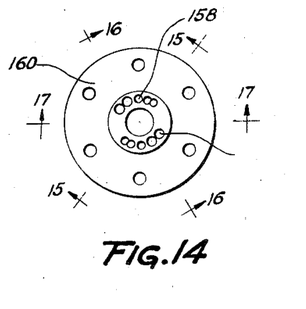
Figure 14 is an elevation, looking in the direction of the arrows 14—14 in Figure 11, of a perforated disk forming part of the controls of both Figures 10-11 and Figures 12-13.
Figure 15:
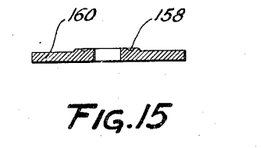
Figures 15, 16, and 17 are sections through the disk respectively on the lines 15—15, 16—16, and 17—17 of Figure 14.
Figure 16:
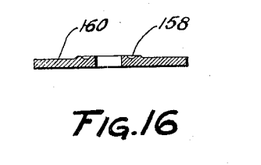
Figure 17:
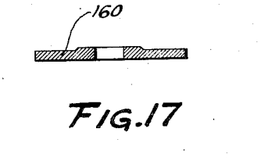

To guard against unintentional shifting into reverse, and to fix definitely the different selector valve positions, arm 146 may be pressed yieldingly by means such as a spring 154 to hold a pair of projections or balls 156 yieldingly in the opposite pair of two series of rounded depressions 158 formed on the rear face of a disk 160 fixedly mounted on the back of the instrument board 162 opposite the selector handle 150. The depressions 158 corresponding to reverse, and to the neutral position just before reverse, are deeper than the others, so that it takes a substantial effort to turn the selector handle 150 to reverse position, and the driver cannot do so unintentionally.

The conduit 138, as shown in Figure 1, is connected to the clutch control vacuum conduit 76, so that the selected shift of the gears is made by releasing the accelerator pedal, which at the same time throws out the clutch. The gearshift and the clutch control are therefore interlocked, and it is impossible to shift the gears accidentally when the clutch is engaged.

In the arrangement of Figures 6, 7, 12, and 13, an arrangement is shown for operating the gearshift directly from the handle 150 without preselection and if desired without an interlock with the clutch control, but with provision for manual shifting if the power fails.

Figure 6:
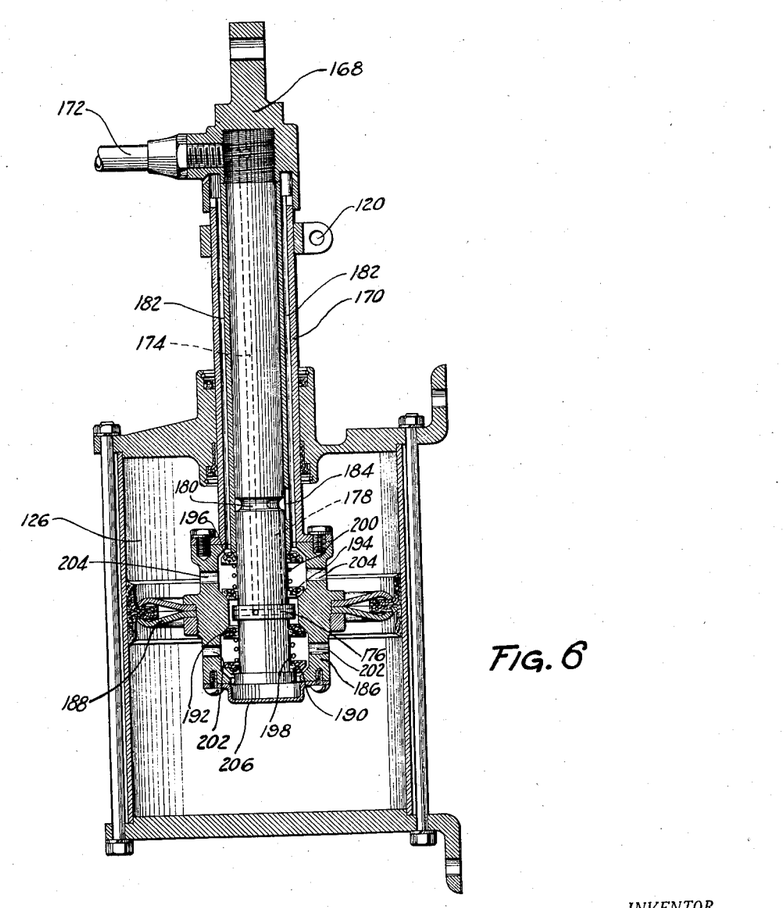
Figure 6 is a section through a modified form of gearshift power unit.
Figure 9:
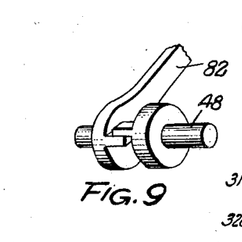
Fig. 9 illustrates a detail of Fig. 8.

In this arrangement the handle 150 is connected through a linkage 166 with the front portion 168 of a two-part piston rod. Portion 168 telescopes into an outer portion 170 to which the crossbar 120 and therefore the shifter rod 116 are connected.

A vacuum connection 172, corresponding to connection 138, and which is connected to conduit 76 if an interlock with the clutch control is desired and directly to the manifold 22 if no interlock is desired, is secured to piston rod portion 168 in communication with a vacuum passage 174 opening outwardly through a collar 176 near the lower (near) end of the piston rod.

An air passage 178 runs from a groove 180 in the piston rod and opens through its lower (rear) end. Air passages 182 are provided between the telescoping piston rod sections 168 and 170, for example by making the latter a loose fit about the former, and an opening 184 provides communication between these air passages and groove 180.

The outer piston rod section 170 is secured at its lower (rear) end to a valve chamber 186 carrying a double-acting power piston 188 corresponding to piston 124. The valve chamber is formed with four conical seats for valves 190, 192, 194, 196 sleeved on the inner piston rod section 168, with a valve spring 198 compressed between valves 190 and 192, and a valve spring 200 compressed between valves 194 and 196. The collar 176 is arranged between the valves 192 and 194, and has a short lost motion before engaging either of them. The valve chamber is formed with ports 202 from the space between valves 190 and 192 to the space below (behind) the piston, and with ports 204 from the space between valves 194 and 196 to the space above (in front of) the piston. A cup-shaped cap 206 forms a chamber over the lower end of the valve chamber 186.

In operation, with the parts as shown the vacuum connection is sealed off by the valves 192 and 194, which are held against their seats by springs 198 and 200. The space above (in front of) the piston communicates with the atmosphere through ports 204, past the open valve 196, and through passages 182. The space below (behind) the piston communicates with the atmosphere through ports 202, past the open valve 190, through passage 178, groove 180, port 184, and passages 182.

If now tension is applied to connections 166, part 168 shifts upward (forward), first closing valve 196 and then (by contact with collar 176) opening valve 194, thereby opening communication between the vacuum passage 174 and the space above (ahead of) the piston. The piston then follows up until the positions shown in Figure 6 are regained. The reverse action takes place if connections 166 are manipulated to push piston rod 168 downward (rearward). In case of failure of the power, after a short lost motion the above-described connections shift the gears manually.

Returning now to Figure 2, the pinion shaft 106 has rotatably sleeved thereon a pair of bevel pinions 210 and 212, of different sizes, meshing respectively with a pair of different-sized bevel ring gears 214 and 216. Splined on the pinion shaft 106 are a pair of dog clutches 218 and 220, rigidly connected to be moved in unison by shifter forks 222 and 224 which are rigidly connected for operation by the same vertical lever 226. Shifting this assembly downwardly (rearwardly) interlocks clutch 220 with pinion 212 and gives one speed; shifting it upwardly (forwardly) interlocks clutch 218 with pinion 210 and gives a different speed.

Figure 3:
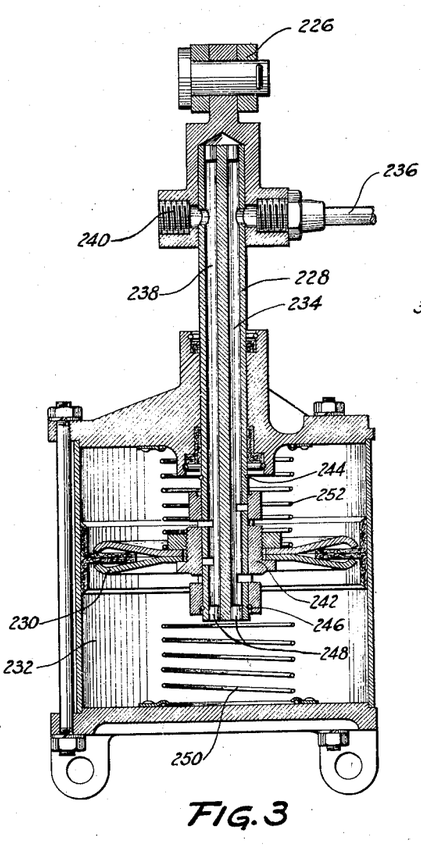
Figure 3 is a horizontal section through the high-second gearshift vacuum unit, this unit being shown in plan in Figure 1 and being located just above the lower right-hand portion of Figure 2.

The vertical lever 226 which operates the above described gear shifting means has its upper end connected to a piston rod 228 operated by a double-acting piston 230 in a cylinder 232 mounted on the top of the gear-box 84. The piston rod 228 is formed with a vacuum passage 234 communicating with a flexible vacuum conduit 236, and with an air passage 238 having an air intake 240 to which a suitable extension, conduit, or air filter, may be secured if desired.

The piston 230 is mounted on a slide valve member 242 sleeved on the piston rod 228 between two abutments shown as provided by snap rings 244 and 246 seated in grooves in the piston rod. The slide valve 242 is formed with ports registrable with openings through the sides of piston rod 228. The ends of the passages 234 and 238 are closed by plugs 248. Springs 250 and 252 clipped to the opposite ends of the cylinder 232, engage the piston 230 and slide valve 242 near the opposite ends of its stroke. This power operator is more fully described and is claimed per se in Patent No. 1,994,835, dated March 19, 1935.

Figure 4:
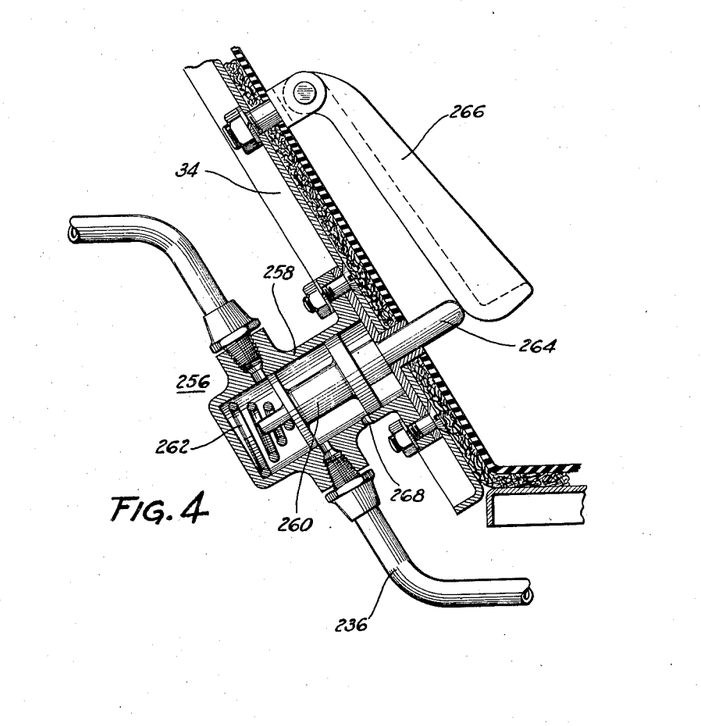
Figure 4 is a vertical section on a larger scale than the corresponding part of Figure 1, through part of the floorboard and through the control for the high-second gearshift.

The vacuum line 236 is connected to a T-fitting 254 in the clutch control line 76 (to interlock this gear-shift also with the clutch control) through a valve 256 shown in detail in Figure 4. This valve includes a valve cylinder 258 bolted to the lower face of the floorboard 34 over an opening therein, and containing a valve piston 260 urged upward by a fairly stiff spring 262, and having a guide plunger 264 extending through the floorboard and engaged by a heel rest or pedal 266 pivotally mounted on the floorboard just below the accelerator pedal 30, in such a position that when the toe of the driver's right foot is on the accelerator pedal his heel is on the rest 266.

It will be seen that when the driver lifts the toe of his right foot, thereby throwing out the clutch, he may go on and depress his heel, thereby admitting vacuum to the power device of Figure 3 and shifting from whichever pinion-and-bevel-gear he has been using to the other one and thereby in effect changing gears,—or, more accurately, changing speeds, since there is direct drive in both of these speeds. In this operation the accelerator operated three-way 78 functions as a master or pilot valve, controlling both of the power actuators 126 and 232 for operating the transmission mechanism.

The above-described power unit piston rod is shown in Figure 3 at the upper and foremost end of its stroke, with pinion 212 driving ring-gear 216. If the valve 256 is manipulated as described above (and with the clutch control valve 78 also opened if the devices are interlocked with each other as shown in Figure 1), vacuum enters through conduit 236, passage 234, and the registering ports in the piston rod and the slide valve 242, behind the piston, while the atmosphere communicates with the space ahead of the piston through passage 238 and the registering ports in the piston rod and slide valve ahead of the piston. The piston thereupon moves toward the other extreme of its movement, engaging near the end of its stroke the spring 250, and shifting the clutch 220 out of engagement with pinion 212 and the clutch 218 into engagement with pinion 210, thereby changing speeds.

Now when the heel is raised and the suction is cut off from conduit 236, air enters through a port 268 (Figure 4) into the space behind piston 230. With the air pressures now balanced on opposite sides of piston 230, spring 250 shifts the slide valve 242 against the abutment 244, ready for the next cycle of operations.

The two ring gears 214 and 216 are bolted or otherwise secured together, and are shown by way of illustration as driving the axle shafts 38 through what is known as a "locking differential". Gear 216 is secured to, or integral with, a central shaft 270 journaled in bearings 272 in the gear-box 84. On one end of shaft 270 is keyed or splined a clutch member 274 having external splines and having clutch sockets or recesses in its outer face. There is a similar clutch member 276 keyed to or formed integrally of the hub part of ring gear 216 opposite the shaft 270.

The clutch members 274 and 276 are encircled by and splined to the external race members 278 of a pair of over-running roller or "Horton" clutches, the wedge rollers of which are indicated at 280. The inner races 282 of these roller clutches are splined to short drive shafts 284 piloted in opposite ends of shaft 270 and journaled in bearings 286 carried by the gear-box 84, and connected to the axle shafts 38 through suitable universal joints 288 (not shown in detail). There are also, of course, universal joints (not shown) at the outer ends of the axle shafts 38 and through which the axle shafts drive the wheels 36.

It will be seen that, with the parts in the positions just described, the roller clutches 278—280—282 act as free wheel units through which the ring gear 216 (and therefore the engine 20) can drive the wheels, although the wheels cannot drive the engine. In rounding a corner, or when from any other reason the one wheel turns faster than the other, all the power goes to the slower wheel and the faster wheel over-runs or "free wheels". On a down grade or when motor is not driving car, both wheels can over-run or free wheel.

It is sometimes desirable (for example when it is desired to use the engine as a brake) to lock out the free wheel units and provide a positive drive all the way from the engine to the wheels. Accordingly, the free wheel or roller clutches 278—280—282 may be made axially shiftable as units, being splined on the shafts 284 and shifted by a shift member 290 pivoted on the gear-box 84 and a bodily-movable shift member 292 moving in a short slot 294 in the gear-box. These shift members shift the two roller clutches toward each other when it is desired to lock them out, whereupon clutch projections or pins on the inner ends of the parts 282 interlock in rigid clutching engagement with the clutch recesses on the outer faces of clutch members 274 and 276.

The shift members 290 and 292 are connected to opposite ends of a double-ended piston rod 296 which passes through both ends of a double-ended cylinder 298 and is secured at its center to a piston 300. The left end of cylinder 298 is vented to the atmosphere at 302. An annularly-arranged series of return springs 304 urges the piston 300 to the left, to lock out the freewheel units.

A vacuum line 306 (Figure 1) is connected to the side of cylinder 298 opposite the air vent 302 and is controlled by a three-way cut-out valve 308 of any desired form and may be similar to the valve of Fig. 5 of Sanford 2,051,906. The valve connects the line 306 directly to the intake manifold 22.

While a separate control may be provided for this valve if desired, it is shown connected to the hand throttle control rod 32 which, by reason of the lost motion provided, acts successively first to close the valve 308, then to prevent actuation of the clutch control valve 78 by preventing complete release movement of the accelerator pedal, and finally gradually to open the engine throttle valve.

It will be noted that if anything goes wrong with the vacuum connections, the freewheel lock-out described above becomes automatically operative.

Another feature of the invention relates to locating the brakes on the above-described unit, where they form part of the sprung weight, preferably between the freewheel units 278—280—282 and the universal joints 288. As shown, the brake drums 312 are secured to and carried by the shafts 284 just outside the gear-box 84. Suitable internal brakes 314, shown actuated by hydraulic cylinders 316 but which may be of any desired character, are carried by backing plates 318 secured to the opposite sides of the gear-box 84.

Figure 18:
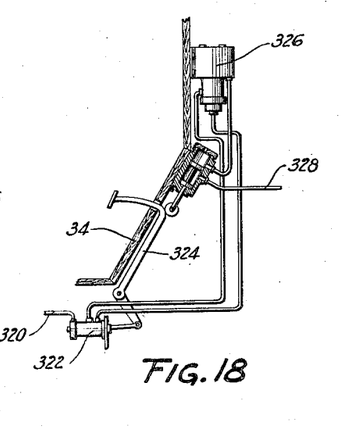
Figure 18 is a vertical section showing the brake pedal and the parts of the brake system immediately associated therewith.

The brakes illustrated form part of a four-wheel brake system connected by hydraulic lines 320 to a master cylinder 322 (Figure 18) operated by a service brake pedal 324. The master cylinder shown is also connected to a supply reservoir 326 which also contains an auxiliary vacuum power brake-applying means having a vacuum line 328 connected to the intake manifold. This arrangement is more fully described and is claimed per se in application No. 609,716, filed May 6, 1932, by Roy S. Sanford and Eugene G. Carroll.

In Figure 2, a speedometer drive 330 is shown driven from one of the shafts 284 by suitable gear-and-shaft connections.

While various particular constructions have been described herein in detail, it is not our intention to limit the scope of the invention to those particular constructions, or otherwise than by the terms of the appended claims.

We claim:

1. A vehicle having individually-sprung drive wheels, a unit between said wheels comprising speed-changing means and direction-changing gearing adapted to drive said means, shafts driven by said gearing and driving said wheels, free-wheel drive means through which the gearing drives the shafts and which includes a lockout device for preventing free-wheeling, and remote controls for the speed-changing means and the lockout device all located conveniently for a driver in a group some distance from said unit.

2. A vehicle having individually-sprung drive wheels, a unit between said wheels comprising speed-changing means and direction-changing gearing adapted to drive said means, shafts driven by said gearing and driving said wheels, free-wheel drive means through which the gearing drives the shafts and which includes a lockout device for preventing free-wheeling, and remote controls for the speed-changing means and the lock-out device located conveniently for a driver in a group some distance from said unit.

3. A vehicle having driving wheels, a unit between said wheels comprising a speed-changing gearing driving said wheels and a change-speed and reverse gearing operable to drive said first gearing, brakes for said wheels carried by said unit, free-wheel means through which said gearing drives the wheels and including a lockout device preventing free-wheel action, and driver-operated remote controls for both gearings and for the brakes and for said lockout device.

4. A vehicle having driving wheels, a unit between said wheels comprising a speed-changing gearing driving said wheels, free-wheel means through which said gearing drives the wheels and including a lockout device for preventing free-wheeling action, and driver-controlled pressure differential operated power means for both gearings and lockout device.

5. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold.

6. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold and one of which is interlocked with said device so that it cannot be operated without releasing the clutch.

7. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold and both of which are interlocked with said device so that neither can be operated without releasing the clutch.

8. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold, one of said means being controlled by a valve positioned for operation by the driver without removing his foot from said device.

9. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold, one of said means being controlled by a valve positioned for operation by the driver without removing his foot from said device and the other having a driver-operable selector valve and being controlled by another valve operated by said device.

10. A vehicle having an engine provided with an intake manifold and a throttle controlling said manifold and a driver-operated device controlling the throttle, drive wheels, and drive-transmitting mechanism from the engine to the wheels comprising a clutch operated by the vacuum in said manifold and controlled by said device and two independently-operable change-speed means both operated by the vacuum in said manifold, at least one of said means having a driver-operable selector valve pre-setting the speed and being controlled as to time of operation by said device.

11. A vehicle having an engine provided with a manifold and a throttle controlling the manifold, a driver-operated device controlling the throttle, drive wheels, and drive-transmitting mechanism from the engine to said wheels including a clutch operated by the vacuum in the manifold and controlled by said device and a speed-change means also operated by the vacuum in the manifold and controlled by said device and a free-wheel drive between said speed-change means and the wheels.

12. A vehicle having an engine, drive wheels, and drive-transmitting mechanism from the engine to said wheels including a power-operated clutch and a power-operated transmission means, a free-wheel drive between said transmission means and the wheels, and a power operated means, interlocked with said power operated transmission means, operable to lock out said free-wheeling device when the transmission is operating in reverse.

13. A vehicle having an engine, drive wheels, and drive-transmitting mechanism from the engine to said wheels including a power-operated clutch and a power-operated speed-change means and a free-wheel drive between said speed-change means and the wheels, the speed-change means being interlocked with the clutch so that it is only operable when the clutch is disengaged.

14. A vehicle having individually-sprung drive wheels, a unit between said wheels comprising a speed-changing gearing and direction-changing gearing adapted to drive said speed-changing gearing, power means for operating said gearing, shafts driven by said gearing and driving said wheels, free-wheel drive means through which the gearing drives the shafts and which includes a power operated lockout device for preventing free-wheeling, and remote controls for the power means located conveniently for a driver in a group some distance from said unit.

15. A vehicle having an accelerator, a hand-operated throttle control means, a transmission, driving wheels, and drive-transmitting mechanism interconnecting said transmission and driving wheels and comprising in combination therewith a free-wheel unit incorporated in said drive-transmitting means, and power means controlled in part by the accelerator and in part by the hand throttle controlled means for rendering said free-wheel unit operative as an overrunning clutch upon release of the accelerator and inoperative with an operation of the hand throttle means.

16. A vehicle having an accelerator, change-speed means, drive wheels, force-transmitting means interconnecting said change-speed means and wheels, and a free-wheel unit incorporated in said force-transmitting means and comprising in combination therewith power means for operating the change-speed means, and power means for operating the free-wheel unit, means controlled in part by the accelerator for controlling the operation of said free-wheel operating power means, and means controlled by said change-speed operating power means for rendering said free-wheel operating power means operative to cut out the operation of said free-wheel unit when the change-speed means is being operated in reverse.

17. A vehicle having a change-speed means, drive wheels, force-transmitting means interconnecting said change-speed means and wheels, and a free-wheel unit incorporated in said force-transmitting means and comprising in combination therewith vacuum power means for operating the change-speed means, and vacuum power means for operating the free-wheel unit, means for controlling the operation of said free-wheel operating power means, and means controlled by said change-speed operating power means for rendering said free-wheel operating power means operative to cut out the operation of said free-wheel unit when the change-speed means is being operated in reverse.

18. A vehicle provided with an accelerator, a change-speed and reverse gearing, power means for operating said gearing, a locking differential, power means for controlling the operation of said differential, and means controlled both by the accelerator and by the gearing operating power means for controlling the operation of said differential.

19. A vehicle provided with an accelerator, a change-speed and reverse gearing, power means for operating said gearing, driving wheels, force-transmitting means interconnecting said wheels and gearing, a plurality of free-wheel units incorporated in said force-transmitting means, power means for rendering said free-wheel units operative either as a one-way clutch unit or as a direct drive unit, and means controlled both by the accelerator and the gearing operating power means for controlling the operation of said free-wheel operating power means.

20. A vehicle provided with an accelerator, a change-speed and reverse gearing, means for operating the gearing, drive wheels, means interconnecting said gearing and wheels, and a plurality of free-wheel units incorporated in the connection between the gearing and wheels, a vacuum and spring operated motor for controlling the operation of said free-wheel units, and means controlled both by the accelerator and by the gearing operating means for controlling the operation of said motor.

21. A vehicle provided with an accelerator, a direction-changing gear unit and a speed-changing gear unit, separate power means for operating each of said units, and means controlled in part by said accelerator for controlling the operation of both of said power means.

22. A vehicle provided with a clutch, a direction-changing gear unit and a speed-changing gear unit, fluid-operated correlated separate power units for operating the clutch and each of said units, the fluid circuits interconnecting said power means being so constructed and arranged that the clutch and direction-changing power units are connected to a circuit which is in parallel with a circuit leading to the speed-changing gear power-operated unit, the circuits leading to the power units for operating the clutch and direction gear unit being in parallel with each other.

23. A vehicle provided with an accelerator, a clutch unit, a direction-changing gear unit, a speed-changing gear unit, and a locking differential unit, four separate power units for operating each of said units, and valvular means controlled in part by the accelerator for controlling the operation of said power units.

24. A vehicle provided with a clutch, an intake manifold and an accelerator, a change-speed and reverse transmission, drive wheels, and free-wheel mechanism interconnecting said wheels and transmission, power means operative to disengage the clutch and render operable the free-wheel mechanism to isolate the transmission and facilitate the operation of the transmission, together with other power means for operating the transmission, and fluid transmitting means interconnecting all of said power means and manifold whereby upon release of the accelerator the power means may be energized by the vacuum of the manifold.

25. A vehicle having an engine provided with an intake manifold and a throttle controlling said manifold, a driver-operated accelerator controlling the throttle, drive wheels, and drive-transmitting mechanism from the engine to the wheels comprising a clutch operated by the vacuum in said manifold and controlled by the accelerator, two independently-operable change-speed means both operable by the vacuum in said manifold, a preselector valve mechanism for controlling the operation of one of said change-speed means, and a valve for controlling the operation of the other of said change-speed means, said latter valve being positioned for operation by the driver without removing his foot from the accelerator.

26. A vehicle provided with an intake manifold, an accelerator, two independently-operable change-speed means, and separate manifold vacuum-operated power means for operating each of said change-speed means, said power means comprising two separate selectively-operable valve means, and a pilot or master valve means operable by the accelerator to either effect or make possible an operation of both of said power means.

27. In an automotive vehicle having an engine, a throttle operating accelerator, a transmission, and drive wheels, a clutch forward of the transmission, a locking differential interposed between the transmission and drive wheels, and power means operative upon the clutch and differential to isolate the transmission from the engine and wheels upon release of the accelerator, and further operative to engage the clutch and insure an operation of the differential upon depressing the accelerator to open the throttle.

28. A vehicle provided with a throttle, a transmission, a clutch forward of the transmission and a clutch rearward of the transmission, separate power means for operating said clutches to isolate the transmission, means for cutting out the operation of said power means, and common means for operating both the throttle and the cut-out means.

29. A vehicle provided with a throttle, a transmission, a clutch forward of the transmission and a clutch rearward of the transmission, separate power means for operating said clutches to isolate the transmission, means for cutting out the operation of said forward clutch operating power means, means for cutting out the operation of said rearward clutch operating power means, and common means for successively operating said cut-out means and then operating the throttle.

30. A vehicle having an intake manifold, a transmission, driving wheels, and drive-transmitting mechanism interconnecting said transmission and driving wheels and comprising in combination therewith a free-wheel unit incorporated in said drive-transmitting means, a free-wheel operating power means connected with said manifold in such manner as to at all times, when the engine is running, render said free-wheel unit operative as an overrunning clutch, and manually operative means for rendering said power means operative to cut out the operation of the free-wheel unit.

31. A vehicle having a transmission, separate clutch mechanism ahead of and to the rear of the transmission, a power means for operating each of said clutches, and a common manually operative means for successively cutting out of operation both of said power means.

32. A vehicle having an engine, an accelerator for controlling said engine, a transmission, and drive wheels, a clutch mechanism interposed between said engine and transmission, and a clutch mechanism interposed between said drive wheels and transmission, accelerator controlled power means for operating said first mentioned clutch, and power means for controlling the operation of said second mentioned clutch, together with a common manually operated means operative first to render the second mentioned power means operative to permanently engage the clutch operatively connected therewith, said manually operated means then being operative, at the will of the driver, to cut out of operation said first mentioned power means.

ROY S. SANFORD.
MONTGOMERY W. McCONKEY.